(12) United States Patent
Sitter et al.

(10) Patent No.: US 11,254,101 B2
(45) Date of Patent: Feb. 22, 2022

(54) STRUCTURED FILM AND ARTICLES THEREOF

(71) Applicant: 3M INNOVATIVE PROPERTIES COMPANY, St. Paul, MN (US)

(72) Inventors: Brett J. Sitter, Cottage Grove, MN (US); David J. Rowe, Roseville, MN (US); John P. Baetzold, North St. Paul, MN (US); Bill H. Dodge, Finlayson, MN (US); Evan L. Schwartz, Vadnais Heights, MN (US); Kevin W. Gotrik, Hudson, WI (US); Christopher S. Lyons, St. Paul, MN (US); Ta-Hua Yu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 145 days.

(21) Appl. No.: 16/319,422

(22) PCT Filed: Jul. 18, 2017

(86) PCT No.: PCT/US2017/042556
§ 371 (c)(1),
(2) Date: Jan. 21, 2019

(87) PCT Pub. No.: WO2018/017552
PCT Pub. Date: Jan. 25, 2018

(65) Prior Publication Data
US 2019/0248111 A1   Aug. 15, 2019

Related U.S. Application Data

(60) Provisional application No. 62/530,586, filed on Jul. 10, 2017, provisional application No. 62/365,468, filed on Jul. 22, 2016.

(51) Int. Cl.
*C09J 7/22* (2018.01)
*B32B 3/30* (2006.01)
(Continued)

(52) U.S. Cl.
CPC ............... *B32B 15/09* (2013.01); *B32B 3/30* (2013.01); *B32B 15/08* (2013.01); *C08J 7/043* (2020.01);
(Continued)

(58) Field of Classification Search
CPC ..... B32B 15/09; B32B 15/08; B32B 2255/20; B32B 2307/418; B32B 2307/7246;
(Continued)

(56) References Cited

U.S. PATENT DOCUMENTS 5,175,030 A   12/1992 Lu
5,183,597 A    2/1993 Lu
(Continued)

FOREIGN PATENT DOCUMENTS

CN   103730603   4/2014
EP     2503621   9/2012
(Continued)

OTHER PUBLICATIONS

International Search Report for PCT International Application No. PCT/US2017/042556, dated Sep. 27, 2017, 5 pages.

*Primary Examiner* — Scott R. Walshon

(57) ABSTRACT

A film including a resin layer comprising a structured major surface opposite a second major surface, the structured major surface including a plurality of features; a barrier layer on the structured major surface; and a first adhesive layer on the barrier layer.

20 Claims, 3 Drawing Sheets

(51) Int. Cl.
| | |
|---|---|
| *B32B 15/09* | (2006.01) |
| *C09J 7/20* | (2018.01) |
| *B32B 15/08* | (2006.01) |
| *C08J 7/04* | (2020.01) |
| *C08J 7/043* | (2020.01) |
| *C08J 7/048* | (2020.01) |
| *C09J 7/25* | (2018.01) |

(52) U.S. Cl.
CPC .............. *C08J 7/048* (2020.01); *C08J 7/0423* (2020.01); *C09J 7/203* (2018.01); *C09J 7/22* (2018.01); *C09J 7/255* (2018.01); *B32B 2255/20* (2013.01); *B32B 2255/205* (2013.01); *B32B 2255/26* (2013.01); *B32B 2255/28* (2013.01); *B32B 2307/418* (2013.01); *B32B 2307/7244* (2013.01); *B32B 2307/7246* (2013.01); *B32B 2367/00* (2013.01); *B32B 2457/206* (2013.01); *C08J 2367/02* (2013.01); *C09J 2301/16* (2020.08)

(58) Field of Classification Search
CPC ........ B32B 2307/7244; B32B 2637/00; B32B 2457/206; B32B 2255/205; B32B 2255/28; C08J 7/0243; C08J 5/18; C08J 2367/02; C09J 7/22; C09J 7/203; C09J 7/255; C09J 7/201; C09J 2201/16
See application file for complete search history.

(56) References Cited

U.S. PATENT DOCUMENTS

| | | |
|---|---|---|
| 5,440,446 A | 8/1995 | Shaw |
| 5,534,391 A | 7/1996 | Wang |
| 5,696,627 A | 12/1997 | Benson |
| 5,888,594 A | 3/1999 | David |
| 6,197,397 B1 | 3/2001 | Sher |
| 7,328,638 B2 | 2/2008 | Gardiner |
| 7,350,442 B2 | 4/2008 | Ehnes |
| 7,604,381 B2 * | 10/2009 | Hebrink ........... B29D 11/00798 362/317 |
| 8,460,568 B2 | 6/2013 | David |
| 8,619,363 B1 * | 12/2013 | Coleman ............ G02B 19/0014 359/576 |
| 8,698,396 B2 | 4/2014 | Maindron |
| 9,862,124 B2 * | 1/2018 | Radcliffe .................... C09J 7/00 |
| 9,887,385 B2 | 2/2018 | Kook |
| 10,036,831 B2 * | 7/2018 | Yu .............................. C09D 7/67 |
| 2005/0134963 A1 * | 6/2005 | Stevenson ......... G02F 1/133606 359/600 |
| 2006/0261737 A1 * | 11/2006 | Bae ..................... H05K 7/20963 313/582 |
| 2008/0291541 A1 * | 11/2008 | Padiyath ................ G02B 5/045 359/569 |
| 2011/0134623 A1 * | 6/2011 | Sherman ................ G02B 6/005 362/19 |
| 2011/0198620 A1 | 8/2011 | Han |
| 2011/0212304 A1 | 9/2011 | Han |
| 2012/0256201 A1 | 10/2012 | Lee |
| 2013/0011608 A1 | 1/2013 | Wolk |
| 2014/0193612 A1 * | 7/2014 | Yu .............................. C08K 9/04 428/143 |
| 2015/0351167 A1 | 12/2015 | Moro |
| 2016/0016338 A1 | 1/2016 | Radcliffe |
| 2016/0025919 A1 | 1/2016 | Boyd |
| 2016/0141149 A1 | 5/2016 | David |
| 2016/0164031 A1 | 6/2016 | Pieper |
| 2018/0261800 A1 | 9/2018 | Hara |

FOREIGN PATENT DOCUMENTS

| | | |
|---|---|---|
| EP | 2744857 | 4/2016 |
| JP | 2006-127841 | 5/2006 |
| JP | 2013-173249 A | 9/2013 |
| JP | 2013-229243 | 11/2013 |
| WO | WO 2000-048037 | 8/2000 |
| WO | WO 2016-021533 | 2/2016 |

* cited by examiner

STRUCTURED FILM AND ARTICLES THEREOF

BACKGROUND

Many electronic devices are sensitive to environmental gases and liquids and are prone to degradation on permeation of the environmental gases and liquids such as oxygen and water vapor. Barrier films have been used for electrical, packaging and decorative applications to prevent the degradation. For example, multilayer stacks of inorganic or hybrid inorganic/organic layers can be used to make barrier films resistant to moisture permeation. Multilayer barrier films have also been developed to protect sensitive materials from damage due to water vapor. The water sensitive materials can be electronic components such as organic, inorganic, and hybrid organic/inorganic semiconductor devices. While the technology of the prior art may be useful, there exists a need for better barrier films useful for packaging electronic components.

SUMMARY

In one aspect, the present disclosure provides a film comprising: a resin layer comprising a structured major surface opposite a second major surface, the structured major surface comprising a plurality of features; a barrier layer on the structured major surface; and a first adhesive layer on the barrier layer.

In another aspect, the present disclosure provides a film comprising: a first adhesive layer comprising a structured major surface opposite a second major surface, the structured major surface comprising a plurality of features; a barrier layer on the structured major surface; and a second adhesive layer on the barrier layer.

In another aspect, the present disclosure provides a film comprising: a first resin layer comprising a structured major surface opposite a second major surface, the structured major surface comprising a plurality of features; a barrier layer on the structured major surface; and a second resin layer on the barrier layer.

In another aspect, the present disclosure provides an article, comprising: the film of the present disclosure; and an oxygen or moisture sensitive device.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

DEFINITIONS

For the following defined terms, these definitions shall be applied for the entire Specification, including the claims, unless a different definition is provided in the claims or elsewhere in the Specification based upon a specific reference to a modification of a term used in the following definitions:

The terms "about" or "approximately" with reference to a numerical value or a shape means +/− five percent of the numerical value or property or characteristic, but also expressly includes any narrow range within the +/− five percent of the numerical value or property or characteristic as well as the exact numerical value. For example, a temperature of "about" 100° C. refers to a temperature from 95° C. to 105° C., but also expressly includes any narrower range of temperature or even a single temperature within that range, including, for example, a temperature of exactly 100° C. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

The terms "a", "an", and "the" include plural referents unless the content clearly dictates otherwise. Thus, for example, reference to a material containing "a compound" includes a mixture of two or more compounds.

BRIEF DESCRIPTION OF THE DRAWINGS

The disclosure may be more completely understood in consideration of the following detailed description of various embodiments of the disclosure in connection with the accompanying figures, in which.

Figure 1:
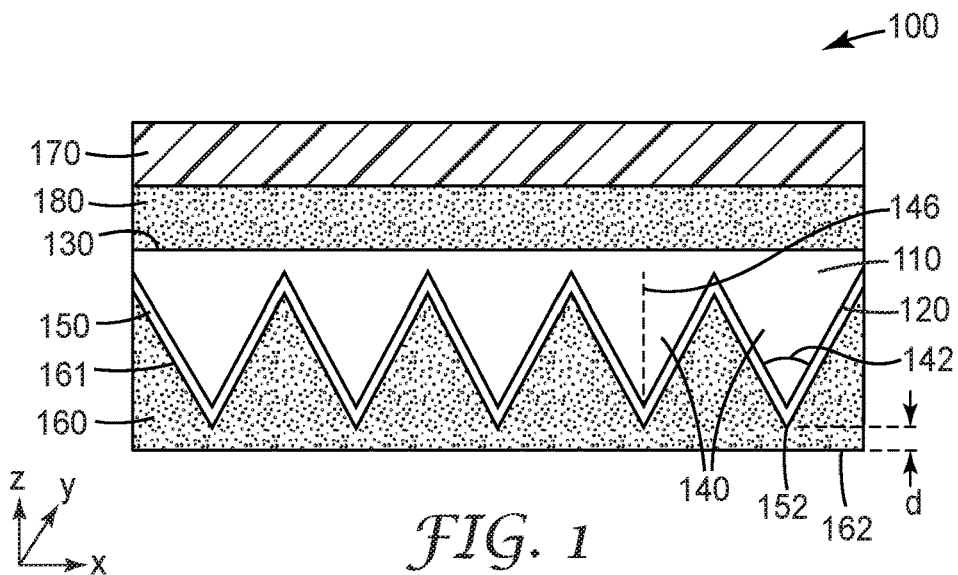
FIG. 1 is a schematic side view of one embodiment of a structured film.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this disclosure.

DETAILED DESCRIPTION

Before any embodiments of the present disclosure are explained in detail, it is understood that the invention is not limited in its application to the details of use, construction, and the arrangement of components set forth in the following description. The invention is capable of other embodiments and of being practiced or of being carried out in various ways that will become apparent to a person of ordinary skill in the art upon reading the present disclosure. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is understood that other embodiments may be utilized and structural or logical changes may be made without departing from the scope of the present disclosure.

As used in this Specification, the recitation of numerical ranges by endpoints includes all numbers subsumed within that range (e.g. 1 to 5 includes 1, 1.5, 2, 2.75, 3, 3.8, 4, and 5, and the like).

Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles or systems described herein may be used in a number of directions and orientations.

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

There is an increased need for barriers for electronic devices, which are sensitive to environmental gases and liquids, for example, organic light-emitting diode (OLED) device to reduce the amount of moisture and oxygen reaching the electronic devices. Typical approaches involve using a barrier film to prevent oxygen and moisture transport in the z direction. However, this does not help in the x and y direction because the adhesive used to attach the barrier film to the OLED provides a large channel for moisture ingress from the side of the device. The present application provides a film, which can prevent transportation of oxygen or moisture in the x and y direction.

FIG. 1 is a schematic side view of one embodiment of film 100. The film 100 includes a resin layer 110 including a structured major surface 120. Resin layer 110 includes a second major surface 130 that is opposite structured major surface 120. Structured major surface 120 includes a plurality of features 140. In some embodiments, features 140 may be microscale features. In some embodiments, features 140 may be microreplicated features. In some embodiments, features 140 may be optical elements. Film 100 may also include a barrier layer 150 on the structured major surface 120 and a first adhesive layer 160 on the barrier layer 150. The first adhesive layer 160 has a first major surface 161 in contact with barrier layer 150 and a second major surface 162 opposite the first major surface 161. In the embodiment of FIG. 1, the distance between the second major surface 162 and apex 152 of barrier layer 150, d, can be from 0 to 50 µm. In some embodiments, features 140 may be linear prisms as illustrated in FIG. 1. In some embodiments, film 100 may include a substrate 170 on the second major surface 130. In other embodiments, film 100 may include an optional second adhesive layer 180 on the second major surface, the optional second adhesive layer 180 being between the second major surface 130 and substrate 170.

Figure 2A:
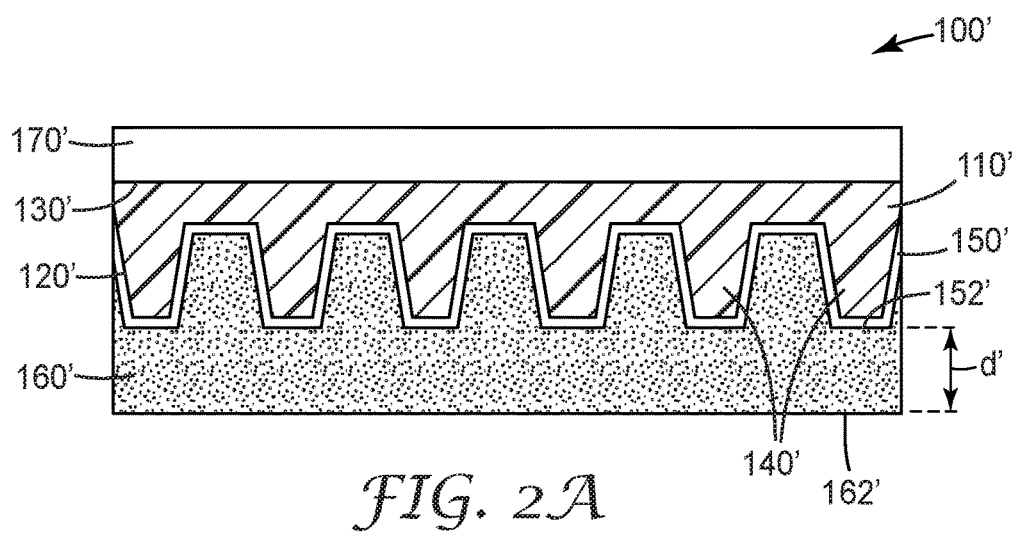
FIG. 2A is a schematic side view of one embodiment of a structured film.
Figure 2B:
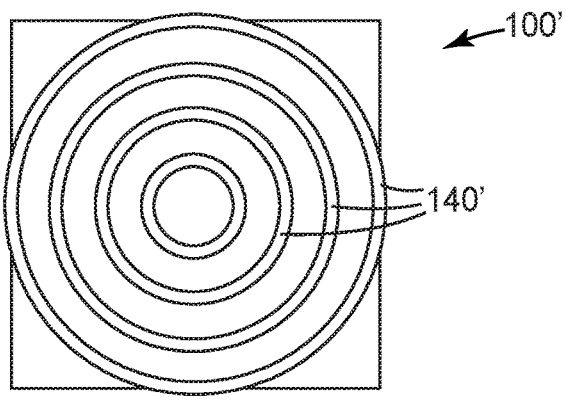
FIG. 2B is a schematic top view of one embodiment of a structured film.

FIG. 2A is a schematic side view of one embodiment of film 100'. The film 100' includes a crosslinked or soluble resin layer 110' including a structured major surface 120'. Resin layer 110' includes a second major surface 130' that is opposite structured surface 120'. Structured major surface 120' includes a plurality of features 140'. In some embodiments, features 140' may be linear prisms. Film 100' may also include a barrier layer 150' on the structured major surface 120' and a viscoelastic or elastomeric adhesive layer 160' on the barrier layer 150'. In some embodiments, film 100' may include a substrate 170' on the second major surface 130'. In the embodiments of FIG. 2, d' may be distance between the second major surface 162' and the top surface 152' of barrier layer 150' and d' may be from 0 to 50 µm. The plurality of features 140' may extend along concentric circles, as illustrated in FIG. 2B, the schematic top view of the embodiment of FIG. 2A, or extend along concentric rectangles, squares, or other polygon shapes, not shown.

Figure 3:
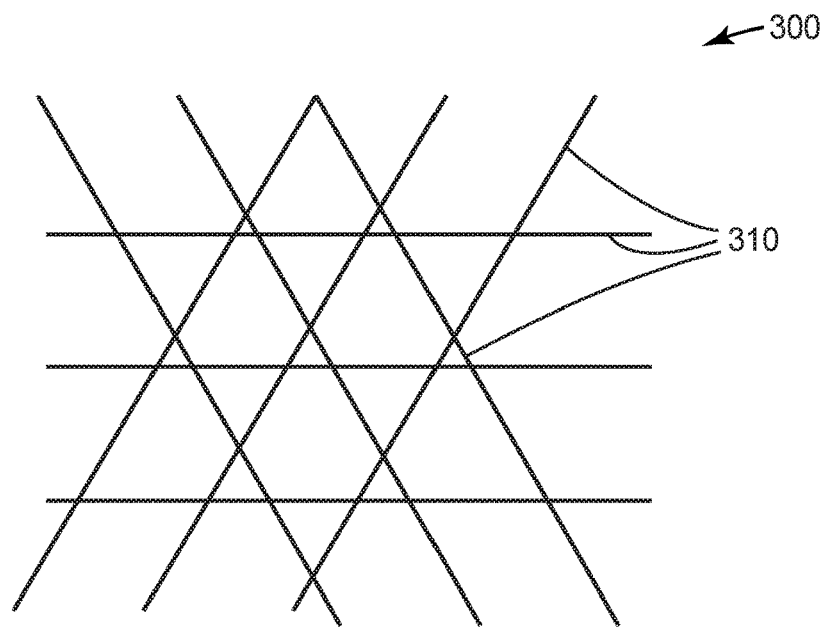
FIG. 3 is a schematic top view of one embodiment of a structured film.

In some embodiments, the plurality of features 140 extend along a first direction, for example, y direction as illustrated in FIG. 1. In some of these embodiments, the plurality of features 140 may be substantially continuous along the first direction, for example, y direction as illustrated in FIG. 1. In some embodiments, the plurality of features 140 are substantially continuous along a second direction, for example, x direction as illustrated in FIG. 1. The plurality of features 140 of the embodiment of FIG. 1 extend along substantially same direction, the y direction. In some embodiments, the plurality of features extend along a parallel first direction, as illustrated in FIG. 1. In other embodiments, at least two of features extend along a non-parallel first direction, as illustrated in FIG. 3, a schematic top view of one embodiment of film 300. In FIG. 3, the plurality of features 310 cross over with each other in the directions that features 310 extend along. In other embodiments, the plurality of features extend along concentric circles, concentric rectangles, squares, or other polygon shapes.

In general, features can be any type microscale or nanoscale structures. In some embodiments, the plurality of features may be randomly arrayed features. In some embodiments, the plurality of features may be randomly arrayed nanoscale features. In some embodiments, the plurality of features may be ordered features. In some embodiments, the plurality of features may include both microscale features and nanoscale features. In some embodiments, at least part of the nanoscale features may be formed on the microscale features. In some embodiments, the plurality of features may include both ordered microscale features and randomly arrayed nanoscale features.

In the exemplary structured film 100, features 140 may be prismatic linear structures. In some embodiments, the cross-sectional profiles of features 140 can be or include curved and/or piece-wise linear portions. For example, in some cases, features can be linear cylindrical lenses extending along the y-direction. Each feature 140 includes an apex angle 142 and a height 146 measured from a common reference plane such as, for example, second major surface 130. In the exemplary structured film 100, height 146 of features 140 are substantially same along the x-direction. In some other embodiments, the height 146 of features 140 can vary along the x-direction. For example, some of the linear features 140 are shorter and some of the linear features 140 are taller. In some embodiments, height 146 of features 140 may be substantially same along the y-direction. For example, a prismatic linear feature 140 may have a constant height along the y-direction. In some other embodiments, the height 146 of features 140 may change along the y-direction. For example, the height 146 of features 140 varies along the y-direction. In such cases, features 140 may have a local height that varies along the y-direction, a maximum height, and an average height.

Apex or dihedral angle 142 can have any value that may be desirable in an application. For example, in some embodiments, apex angle 142 can be in a range from about 70 degrees to about 120 degrees, or from about 80 degrees to about 100 degrees, or from about 85 degrees to about 95 degrees. In some embodiments, features 140 have equal apex angles which can, for example, be in a range from about 88 or 89 degrees to about 92 or 91 degrees, such as 90 degrees.

Resin layer can have any index of refraction that may be desirable in an application. For example, in some cases, the index of refraction of the resin layer 110 is in a range from about 1.4 to about 1.8, or from about 1.5 to about 1.8, or from about 1.5 to about 1.7. In some cases, the index of refraction of the resin layer 110 is not less than about 1.4, not less than about 1.5, or not less than about 1.55, or not less than about 1.6, or not less than about 1.65, or not less than about 1.7. The first or second adhesive layer 160 or 180 can have any index of refraction that may be desirable in an application. In some embodiments, the resin layer has a first refractive index, the first or second adhesive layer has a second refractive index and the second refractive index is different from the first refractive index. In other embodiments, the second refractive index is substantially the same as the first refractive index so that the resin layer and the first or second adhesive layer are index matched.

The resin layer may include a crosslinked or soluble resin. Suitable crosslinked or soluble resin include those described in U.S. Pat. App. Pub. No. 2016/0016338 (Radcliffe et al.), for example, UV-curable acrylates, such as polymethyl methacrylate (PMMA), aliphatic urethane diacrylates (such as Photomer 6210, available from Sartomer Americas, Exton, Pa.), epoxy acrylates (such as CN-120, also available from Sartomer Americas), and phenoxyethyl acrylate (available from Sigma-Aldrich Chemical Company, Milwaukee, Wis.). Other suitable curable resins include moisture cured resins such as Primer M available from MAPEI Americas (Deerfield Beach, Fla.). Additional suitable viscoelastic or elastomeric adhesives and additional suitable crosslinkable resins are described in U.S. Pat. App. Pub. No. 2013/0011608 (Wolk et al.). As used herein, a "soluble resin" is a resin having the material property that it is soluble in a solvent that is suitable for use in a web coating process. In some embodiments, soluble resins are soluble to at least 3 weight percent, or at least 5 weight percent, or at least 10 weight percent or at least 20 weight percent or at least 50 weight percent at 25. degree. C. in at least one of methyl ethyl ketone (MEK), toluene, ethyl acetate, acetone, methanol, ethanol, isopropanol, 1,3 dioxolane, tetrahydrofuran (THF), water and combinations thereof. A soluble resin layer may be formed by coating a solvent-borne soluble resin and evaporating the solvent. Soluble resin layers may have low or substantially no birefringence. Suitable soluble resins include VITEL 1200B available from Bostik, Inc. (Wauwatosa, Wis.), PRIPOL 1006 available from Croda USA (New Castle, Del.), and soluble aziridine resins as described, for example, in U.S. Pat. Pub. No. 5,534,391 (Wang). Structured resin layer with features prepared according to a process as described, for example, in U.S. Pat. No. 5,175,030 (Lu et al.); U.S. Pat. No. 5,183,597 (Lu); U.S. Pat. App. Pub. No. 2016/0016338 (Radcliffe et al.); U.S. Pat. App. Pub. No. 2016/0025919 (Boyd) by a tool fabricated using a diamond turning method that utilized a fast tool servo (FTS) as described, for example, in PCT Published Application No. WO 00/48037 (Campbell et al.), and U.S. Pat. No. 7,350,442 (Ehnes et al.) and U.S. Pat. No. 7,328,638 (Gardiner et al.).

Barrier layer may include an inorganic barrier layer and a first crosslinked polymer layer. In some embodiments, the barrier layer 150 further comprises a second crosslinked polymer layer, and the inorganic barrier layer is sandwiched by the first and second crosslinked polymer layers.

The inorganic barrier layer can be formed from a variety of materials including, for example, metals, metal oxides, metal nitrides, metal carbides, metal oxynitrides, metal oxyborides, and combinations thereof. Exemplary metal oxides include silicon oxides such as silica, aluminum oxides such as alumina, titanium oxides such as titania, indium oxides, tin oxides, indium tin oxide (ITO), tantalum oxide, zirconium oxide, niobium oxide, and combinations thereof. Other exemplary materials include boron carbide, tungsten carbide, silicon carbide, aluminum nitride, silicon nitride, boron nitride, aluminum oxynitride, silicon oxynitride, boron oxynitride, zirconium oxyboride, titanium oxyboride, and combinations thereof. In some embodiments, the inorganic barrier layer may include at least one of ITO, silicon oxide, or aluminum oxide. In some embodiments, the first or second polymer layer may be formed by applying a layer of a monomer or oligomer and crosslinking the layer to form the polymer in situ, for example, by evaporation and vapor deposition of a radiation-crosslinkable monomer cured by, for example, using an electron beam apparatus, UV light source, electrical discharge apparatus or other suitable device.

Barrier layer may include at least one selected from the group consisting of individual metals, two or more metals as mixtures, inter-metallics or alloys, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides; diamond-like materials including dopants such as Si, O, N, F, or methyl groups; amorphous or tetrahedral carbon structures, amorphous or tetrahedral carbon structures including H or N, graphene, graphene oxide, and combinations thereof. In some embodiments, the barrier layer 150 may conveniently be formed of metal oxides, metal nitrides, metal oxy-nitrides, and metal alloys of oxides, nitrides and oxy-nitrides. In one aspect the barrier layer 150 may include a metal oxide. In some embodiments, the barrier layer 150 may include at least one the metal oxides or metal nitrides selected from the group of silicon oxides, aluminum oxides, titanium oxides, indium oxides, tin oxides, indium tin oxide (ITO), halfnium oxide, tantalum oxide, zirconium oxide, zinc oxide, niobium oxide, silicon nitrides, aluminum nitrides, and combinations thereof. The barrier layer 150 can typically be prepared by reactive evaporation, reactive sputtering, chemical vapor deposition, plasma enhanced chemical vapor deposition, and atomic layer deposition. Preferred methods include vacuum preparations such as reactive sputtering and plasma enhanced chemical vapor deposition, and atomic layer deposition.

The first or second adhesive layer 160 or 180 can include a viscoelastic or elastomeric adhesive. Viscoelastic or elastomeric adhesives can include those described in U.S. Pat. App. Pub. No. 2016/0016338 (Radcliffe et al.), for example, pressure-sensitive adhesives (PSAs), rubber-based adhesives (e.g., rubber, urethane) and silicone-based adhesives. Viscoelastic or elastomeric adhesives also include heat-activated adhesives which are non-tacky at room temperature but become temporarily tacky and are capable of bonding to a substrate at elevated temperatures. Heat activated adhesives are activated at an activation temperature and above this temperature have similar viscoelastic characteristics as PSAs. Viscoelastic or elastomeric adhesives may be substantially transparent and optically clear. Any of the viscoelastic or elastomeric adhesives of the present description may be viscoelastic optically clear adhesives. Elastomeric materials may have an elongation at break of greater than about 20 percent, or greater than about 50 percent, or greater than about 100 percent. Viscoelastic or elastomeric adhesive layers may be applied directly as a substantially 100 percent solids adhesive or may be formed by coating a solvent-borne adhesive and evaporating the solvent. Viscoelastic or elastomeric adhesives may be hot melt adhesives which may be melted, applied in the melted form and then cooled to form a viscoelastic or elastomeric adhesive layer. Suitable viscoelastic or elastomeric adhesives include elastomeric polyurethane or silicone adhesives and the viscoelastic optically clear adhesives CEF22, 817x, and 818x, all available from 3M Company, St. Paul, Minn. Other useful viscoelastic or elastomeric adhesives include PSAs based on styrene block copolymers, (meth)acrylic block copolymers, polyvinyl ethers, polyolefins, and poly(meth)acrylates. The first or second adhesive layer 160 or 180 can include a UV cured adhesive.

Substrate 170 may include any of a wide variety of non-polymeric materials, such as glass, or various thermoplastic and crosslinked polymeric materials, such as polyethylene terephthalate (PET), polyethylene naphthalate (PEN), (e.g. bisphenol A) polycarbonate, cellulose acetate, poly(methyl methacrylate), and polyolefins such as biaxially oriented polypropylene, cyclic olefin polymer (COP), cyclic olefin copolymer (COP) which are commonly used in various optical devices. In some embodiments, the substrate 170 may be a barrier film. In some embodiments, the substrate 170 may be removable substrate.

Figure 4:
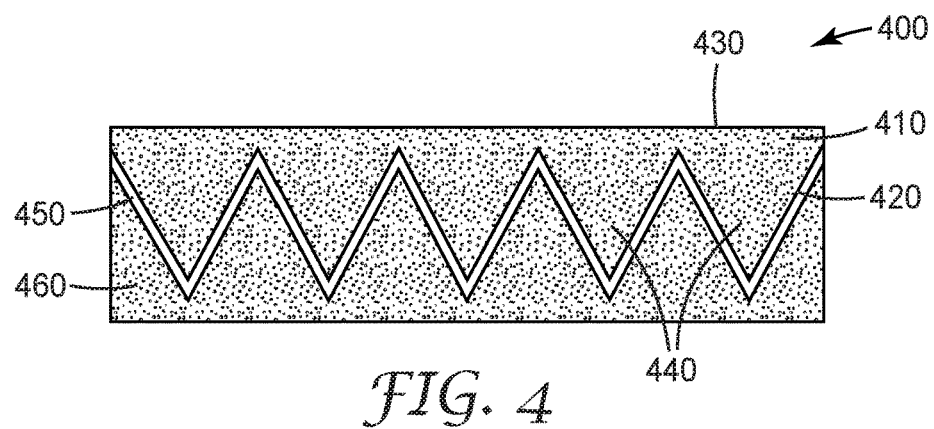
FIG. 4 is a schematic side view of one embodiment of a structured film.

FIG. 4 is a schematic side view of one embodiment of film 400. The film 400 includes a first adhesive layer 410 including a structured major surface 420. The first adhesive layer 410 includes a second major surface 430 that is opposite structured major surface 420 opposite a second major surface. Structured major surface 420 includes a plurality of features 440. Film 400 may also include a barrier layer 450 on the structured major surface 420 and a second adhesive layer 460 on the barrier layer 450. The first adhesive layer and second adhesive layer may include a same or different adhesive. The first adhesive layer and second adhesive layer may have a same or different refractive index.

Figure 5:
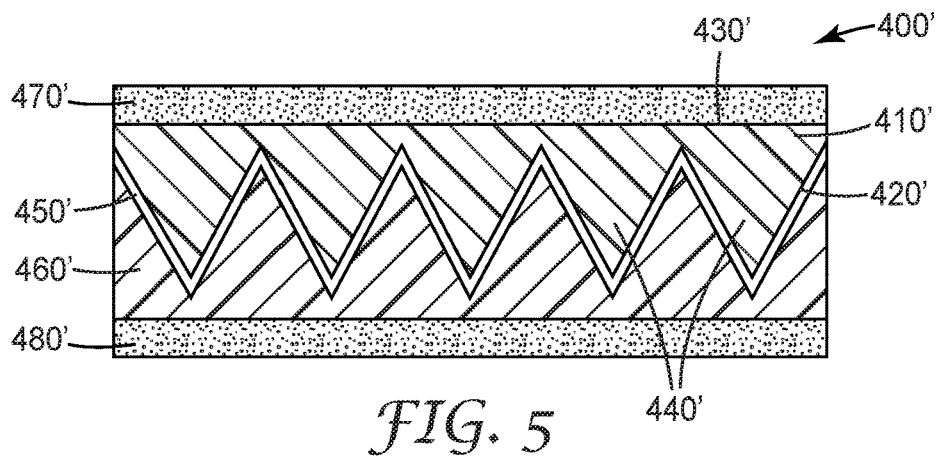
FIG. 5 is a schematic side view of one embodiment of a structured film.

FIG. 5 is a schematic side view of one embodiment of film 400'. The film 400' includes a first resin layer 410' including a structured major surface 420'. The first resin layer 410' includes a second major surface 430' that is opposite structured major surface 420' opposite a second major surface. Structured major surface 420' includes a plurality of features 440'. Film 400' may also include a barrier layer 450' on the structured major surface 420' and a second resin layer 460' on the barrier layer 450'. The first resin layer and second resin layer may include a same or different resin. The film 400' may include a first adhesive layer 470' on the second major surface 430'. The film 400' may also include a second adhesive layer 480' on the second resin layer 460'.

Figure 6A:
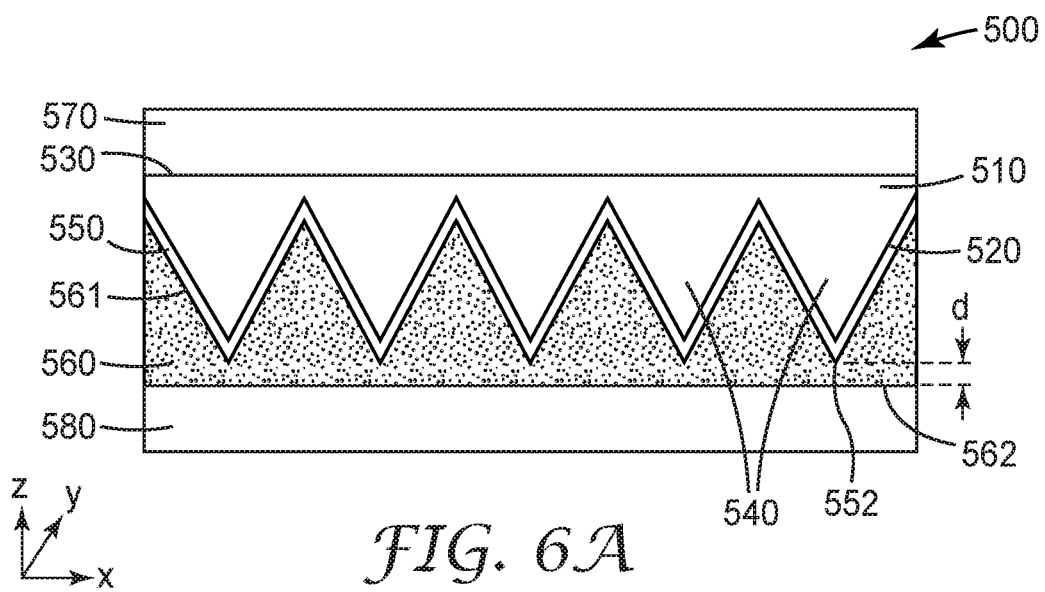
FIGS. 6A and 6B is a schematic side view of one embodiment of an article.
Figure 6B:
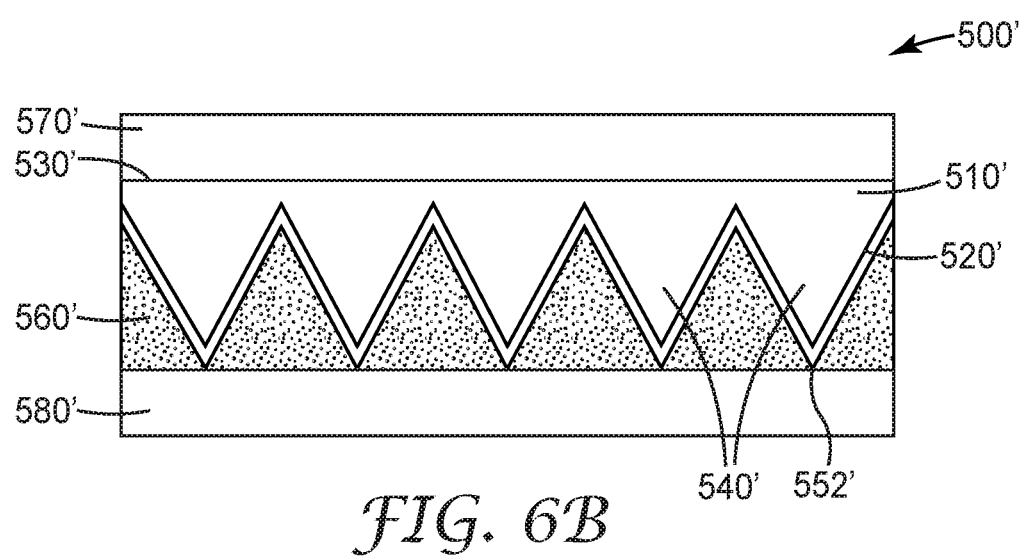

FIG. 6A is a schematic side view of one embodiment of article 500. Article 500 include the films of the present disclosure, including a resin layer 510 including a structured major surface 520. Resin layer 510 includes a second major surface 530 that is opposite structured surface 520. Structured major surface 520 includes a plurality of features 540. Article 500 may also include a barrier layer 550 on the structured major surface 520 and a first adhesive layer 560 on the barrier layer 550. The first adhesive layer 560 has a first major surface 561 in contact with barrier layer 550 and a second major surface 562 opposite the first major surface 561. In the embodiment of FIG. 6A, the distance between the second major surface 562 and apex 552 of barrier layer 550, d, can be from 0 to 50 µm. Article 500 may further include an oxygen or moisture sensitive device 580 in contact with the adhesive layer 560. Suitable oxygen or moisture sensitive device 580, may include but not limited to, OLED devices, quantum dot, or photovoltaic devices and solar panels. Article 500 may further include a substrate 570 on the second major surface 530. The film of the present disclosure may provide barrier properties in both the x-y direction and the z direction, especially when d, the distance between the second major surface 562' and apex 552' of barrier layer 550', is 0 or close to 0, as illustrated in FIG. 6B. The barrier layer 550 can conform to the shape of features 540 and thus can prevent the moisture or oxygen spreading in x-y direction in addition to z direction. This could eliminate the need for an additional barrier film on top of the oxygen or moisture sensitive device. In addition, there is no need for sealing the edge of the device, since there are x-y direction barrier to prevent the moisture or oxygen spreading.

The following embodiments are intended to be illustrative of the present disclosure and not limiting.

EMBODIMENTS

Embodiment 1 is a film comprising:
a resin layer comprising a structured major surface opposite a second major surface, the structured major surface comprising a plurality of features;
a barrier layer on the structured major surface; and
a first adhesive layer on the barrier layer.

Embodiment 2 is the film of embodiment 1, wherein the plurality of features extend along a first direction.

Embodiment 3 is the film of embodiment 2, wherein at least two of features extend along a non-parallel first direction.

Embodiment 4 is the film of any one of embodiments 1 to 3, wherein the plurality of features are substantially continuous along a second direction.

Embodiment 5 is the film of any one of embodiments 1 to 4, the plurality of features are linear prisms extending along concentric circles, rectangles, squares, or other polygon shapes.

Embodiment 6 is the film of any one of embodiments 1 to 5, further comprising a substrate on the second major surface.

Embodiment 7 is the film of any one of embodiments 1 to 5, further comprising a second adhesive layer on the second major surface.

Embodiment 8 is the film of any one of embodiments 1 to 7, wherein the resin layer has a first refractive index, the first or second adhesive layer has a second refractive index and the second refractive index is different from the first refractive index.

Embodiment 9 is the film of any one of embodiments 1 to 7, wherein the resin layer has a first refractive index, the first or second adhesive layer has a second refractive index and the second refractive index is substantial same as the first refractive index.

Embodiment 10 is the film of any one of embodiments 1 to 9, wherein the barrier layer comprises an inorganic barrier layer and a first crosslinked polymer layer.

Embodiment 11 is the film of embodiment 10, wherein the barrier layer further comprises a second crosslinked polymer layer, and the inorganic barrier layer is sandwiched by the first and second crosslinked polymer layers.

Embodiment 12 is the film of any one of embodiments 1 to 11, wherein the barrier layer comprises at least one selected from the group consisting of individual metals, two or more metals as mixtures, inter-metallics or alloys, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides; diamond-like materials including dopants such as Si, O, N, F, or methyl groups; amorphous or tetrahedral carbon structures, amorphous or tetrahedral carbon structures including H or N, graphene, graphene oxide, and combinations thereof.

Embodiment 13 is the film of embodiment 12, wherein the barrier layer comprises metal oxides or metal nitrides.

Embodiment 14 is the film of embodiment 13, wherein the metal oxides or metal nitrides is selected from the group of silicon oxides, aluminum oxides, titanium oxides, indium oxides, tin oxides, indium tin oxide (ITO), halfnium oxide, tantalum oxide, zirconium oxide, zinc oxide, niobium oxide, silicon nitrides, aluminum nitrides, and combinations thereof.

Embodiment 15 is the film of any one of embodiments 1 to 14, wherein the first or second adhesive layer comprises a viscoelastic or elastomeric adhesive.

Embodiment 16 is the film of any one of embodiments 1 to 15, wherein the resin layer comprises a crosslinked or soluble resin.

Embodiment 17 is the film of any one of embodiments 1 to 16, wherein the plurality of features are nanoscale features.

Embodiment 18 is the film of any one of embodiments 1 to 17, wherein the plurality of features are randomly arrayed features.

Embodiment 19 is the film of embodiment 18, wherein the randomly arrayed features are randomly arrayed nanoscale features.

Embodiment 20 is the film of any one of embodiments 1 to 17, wherein the plurality of features comprise microscale features and nanoscale features.

Embodiment 21 is the film of embodiment 20, wherein the plurality of features comprise ordered microscale features and randomly arrayed nanoscale features.

Embodiment 22 is the film of embodiment 20, wherein the nanoscale features are formed on the microscale features.

Embodiment 23 is a film comprising:
a first adhesive layer comprising a structured major surface opposite a second major surface, the structured major surface comprising a plurality of features;
a barrier layer on the structured major surface; and
a second adhesive layer on the barrier layer.

Embodiment 24 is a film comprising:
a first resin layer comprising a structured major surface opposite a second major surface, the structured major surface comprising a plurality of features;
a barrier layer on the structured major surface; and
a second resin layer on the barrier layer.

Embodiment 25 is the film of embodiment 24, further comprising a first adhesive layer on the second major surface.

Embodiment 26 is the film of embodiment 25, further comprising a second adhesive layer on the second resin layer.

Embodiment 27 is a film comprising:
a first adhesive layer comprising a structured major surface opposite a second major surface, the structured major surface comprising a plurality of features; and
a barrier layer on the structured major surface.

Embodiment 28 is a film comprising:
a first resin layer comprising a structured major surface opposite a second major surface, the structured major surface comprising a plurality of features; and
a barrier layer on the structured major surface.

Embodiment 29 is the film of embodiment 6, wherein the substrate is a barrier film.

Embodiment 30 is the film of any one of embodiments 1 to 29, wherein the substrate is a removable substrate.

Embodiment 31 is an article, comprising:
the film of any one of embodiments 1 to 30; and
an oxygen or moisture sensitive device.

Embodiment 32 is the article of embodiment 31, wherein the film is adjacent to the oxygen or moisture sensitive device.

Embodiment 33 is the article of any one of embodiments 31 to 32, wherein the oxygen or moisture sensitive device is an OLED device.

Embodiment 34 is the article of the film of any one of embodiments 31 to 32, wherein the oxygen or moisture sensitive device is a solar panel.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Solvents and other reagents used may be obtained from Sigma-Aldrich Chemical Company (Milwaukee, Wis.) unless otherwise noted. In addition, Table 1 provides abbreviations and a source for all materials used in the Examples below:

TABLE 1

Materials.

| Tradename or reference | Description | Source |
|---|---|---|
| SR833S | liquid tricyclodecane dimethanol diacrylate | Sartomer USA, LLC, Exton, PA |
| Dynasylan 1189 | N-(n-butyl)-3-aminopropyltrimethoxysilane | Evonik, Essen, DE |
| Irgacure 184 | 1-hydroxycyclohexyl phenyl ketone | BASF Corporation, Tarrytown, NY |
| Irgacure 1173 | 2-Hydroxy-2-methyl-1-phenyl-1-propanone | BASF Corporation, Tarrytown, NY |
| 90%/10% wt % silicon/aluminum | Sputter targets | Soleras Advanced Coatings US, Biddeford, ME |
| TMA | Trimethylaluminum | Strem Chemicals, Inc., Newburyport, MA |
| PIB | Polyisobutylene adhesive | BASF Corporation, Tarrytown, NY |
| CEF28 | Optically clear adhesive | 3M Corporation, St. Paul, MN |
| CN120 | Epoxy acrylate | Sartomer USA, LLC, Exton, PA |
| PEA | 2-Phenoxyethyl acrylate | TCI America, Portland, OR |
| TPO | Diphenyl(2,4,6-trimethylbenzoyl)phosphine oxide | PL Industries, a division of Esstech, Inc., Essington, PA |
| Melinex 454 PET | polyethylene terephthalate | Teijin DuPont Films, Chester, VA |

Test Methods

Moisture Barrier Performance

Moisture barrier performance was measured using a calcium corrosion test, as described below. First, a thin, opaque, reflective layer (about 100 nm thick) of metallic calcium was thermally evaporated onto a glass slide, within an inert environment to prevent premature corrosion. Then, samples with an adhesive were laminated to the Ca-coated glass slide. The slide was then exposed to 60° C. and 90% relative humidity. At different points in time during aging, the slide was examined using a high resolution optical scanner. As moisture penetrates the protective layer, it corrodes the metallic calcium, converting the metallic calcium from an opaque material to a transparent oxide. The optical scanner interprets this reaction as loss in optical density of the slide, and this property is correlated to water vapor transmission rate (WVTR).

Example 1

Substrate/Ordered Micro-Array/Sputtered Barrier/Adhesive/Liner Ordered Micro-Array Example 1 was prepared using a tool that was fabricated using a diamond turning method as described in U.S. Pat. No. 5,696,627 (Benson et al.). The tool was used in a cast-and-cure process as described, for example, in U.S. Pat. No. 5,175,030 (Lu et al.) and U.S. Pat. No. 5,183,597 (Lu), to produce an ordered micro-array consisting of truncated pyramidal microstructures on the primed side of a 5 mil (0.13 mm) thick PET film (Melinex 454, Teijin DuPont Films, Chester, Va.). An acrylate resin having a refractive index of 1.56 was used to form the microstructures. This acrylate resin was a polymerizable composition prepared by mixing CN-120, PEA, Irgacure 1173, and TPO at a weight ratio of 75/25/0.25/0.1. The microstructures had a peak-to-valley height of 35 microns and a pitch (peak-to-peak or valley-to-valley distance) of 120 microns.

Sputtered Barrier

The barrier stack was prepared by coating the microstructured side of the ordered micro-array described above with a stack of layers consisting of a base polymer (Layer 1), an inorganic silicon aluminum oxide ($SiAlO_x$) barrier layer (Layer 2), and a protective polymeric layer (Layer 3) to produce a barrier-coated microstructured film. The three layers were coated in a vacuum coater similar to the coater described in U.S. Pat. No. 5,440,446 (Shaw, et al.) with the exception of using one or more sputtering sources instead of one evaporator source. The individual layers were formed as follows:

Layer 1 (Base Polymer Layer)

The film with the ordered micro-array substrate on one major surface (referred to as the frontside surface) was loaded into a roll-to-roll vacuum processing chamber. The chamber was pumped down to a pressure of $2\times10^{-5}$ Torr. A web speed of 4.9 meter/min was held while maintaining the backside (the major surface without microstructures) of the film in contact with a coating drum chilled to −10° C. With the backside in contact with the drum, the film frontside surface was treated with a nitrogen plasma at 0.02 kW of plasma power. The film frontside surface was then coated with tricyclodecane dimethanol diacrylate monomer (obtained under the trade designation "SR833S", from Sartomer USA, Exton, Pa.). The monomer was degassed under vacuum to a pressure of 20 mTorr prior to coating, combined with Irgacure 184 at a 95:5 wt % ratio of SR833S to Irgacure 184, loaded into a syringe pump, and pumped at a flow rate of 1.33 mL/min through an ultrasonic atomizer operating at a frequency of 60 kHz into a heated vaporization chamber maintained at 260° C. The resulting monomer vapor stream condensed onto the film surface and was crosslinked by exposure to ultra-violet radiation from mercury amalgam UV bulbs (Model MNIQ 150/54 XL, Heraeus, Newark N.J.) to form an approximately 750 nm thick base polymer layer.

Layer 2 (Barrier Layer)

Immediately after the base polymer layer deposition and with the backside of the film still in contact with the drum, a $SiAlO_x$ layer was sputter-deposited atop the cured base polymer layer. An alternating current (AC) 60 kW power supply (obtained from Advanced Energy Industries, Inc., of Fort Collins, Colo.) was used to control a pair of rotatable cathodes housing two 90% Si/10% Al sputtering targets (obtained from Soleras Advanced Coatings US, of Biddeford, Me.). During sputter deposition, the oxygen flow rate signal from the gas mass flow controller was used as an input for a proportional-integral-differential control loop to maintain a predetermined power to the cathode. The sputtering conditions were: AC power 16 kW, 600 V, with a gas mixture containing 350 standard cubic centimeter per minute (sccm) argon and 190 sccm oxygen at a sputter pressure of 4.0 mTorr. This resulted in an 18-28 nm thick $SiAlO_x$ layer deposited atop the base polymer layer (Layer 1).

Layer 3 (Protective Polymeric Layer)

Immediately after the $SiAlO_x$ layer deposition and with the film still in contact with the drum, a second acrylate was coated and crosslinked using the same general conditions as for Layer 1, but the composition of this protective polymeric layer contained 3 wt. % of N-(n-butyl)-3-aminopropyltrimethoxysilane (obtained as DYNASYLAN 1189 from Evonik of Essen, Del.) and 5 wt. % Irgacure 184, with the remainder being Sartomer SR833S.

Index-Matched Adhesive

A liquid optically clear adhesive resin (CEF28) was then applied to the barrier-coated microstructured film. The liquid optically clear adhesive resin was then covered with a release liner. Pressure was then applied to the release liner to ensure complete contact between the liquid optically clear adhesive resin and the microstructures on the surface of the barrier-coated microstructured film. The liquid optically clear adhesive resin was then cured using a standard 350 nm UV light source to cross-link the resin, resulting in a cured optically clear adhesive on the surface of the barrier-coated microstructured film.

Example 2

Substrate/Ordered Micro-Array/ALD Barrier/Polymer Layer/Adhesive/Liner

Example 2 was made by a process similar to that of Example 1, but the sputtered barrier stack was replaced with an atomic layer deposition (ALD) barrier stack. The ALD barrier stack was prepared by coating the microstructured side of the ordered micro-array with an inorganic multilayer oxide prepared by ALD (Layer 1) and a protective polymeric layer (Layer 2). The individual layers were formed as follows:

Layer 1 (ALD Barrier Layer)

Aluminum oxide ($Al_2O_3$) was deposited by ALD using trimethylaluminum (TMA) and water as the ALD reactants at a growth temperature of 150° C. The substrate was exposed to 150 ALD TMA/water cycle pairs yielding an $Al_2O_3$ layer approximately 15 nm thick. Prior to deposition, the substrate was exposed to an ozone pre-treatment consisting of 120 pulses of ozone (1.5 Torr pulse, 17 n/n %, where n/n % refers to the mole percent ozone, moles $nO_3/n(O_3+O_2)$).

Layer 2 (Protective Polymer Layer)

Following the ALD process, a protective acrylate coating (99:1 wt % ratio of SR833S to Irgacure 1173) was applied directly onto the $Al_2O_3$ layer using a spin-coating process. The acrylate monomer was cured in a nitrogen-purged UV chamber to yield a protective polymer layer approximately 750 nm thick.

Example 3

Substrate/Concentric Micro-Array/ALD Barrier/Polymer Layer/Adhesive/Liner

A third example was made that was similar to that of Example 2, but a concentric micro-array was substituted for the ordered micro-array, using the 3M Company product Daylighting Radial Lens Film DRLP22. The center of the example corresponded to the center of the concentric rings. The height of the concentric ring array was approximately 200 micrometers tall, and the rings were spaced approximately 1-2 mm apart.

Example 4

Substrate/Nano-Array/Sputtered Barrier/Polymer Layer/Adhesive/Liner

A fourth example was made using a process similar to that of Example 1, but an ordered nano-scale array was substituted for the ordered micro-array. Example 4 was prepared using a tool that was fabricated using a diamond turning method that utilized a fast tool servo (FTS) as described, for example, in PCT Published Application No. WO 00/48037 (Campbell et al.), and U.S. Pat. No. 7,350,442 (Ehnes et al.) and U.S. Pat. No. 7,328,638 (Gardiner et al.). The array was produced on the primed side of a 2 mil thick PET film (3M Greenville, S.C.). An acrylate resin having a refractive index of 1.56 was used to form the structures. This acrylate resin was a polymerizable composition prepared by mixing CN-120, PEA, Irgacure 1173, and TPO at a weight ratio of 75/25/0.25/0.1. The structures had a peak-to-valley height of 100-300 nanometers and a pitch (peak-to-peak or valley-to-valley distance) of 10 microns.

Example 5

Substrate/Random Nano-Array/ALD Barrier/Polymer Layer/Adhesive/Liner

A fifth example was made similar to Example 2, but replacing the ordered micro-array with a randomly produced nano-scale array as described in U.S. Pat. No. 8,460,568 (David et al), U.S. Published Application No. 2,016,014, 1149 (David et al) and European Patent No. 2,744,857 B1 (Yu et al).

Example 6

Substrate/Ordered Micro-Array/Random Nano-Array/ALD Barrier/Polymer Layer/Adhesive Ordered Micro-Array Example 6 was prepared using a tool that was fabricated using a diamond turning method as described in U.S. Pat. No. 5,696,627 (Benson et al.). The tool was used in a cast-and-cure process as described, for example, in U.S. Pat. No. 5,175,030 (Lu et al.) and U.S. Pat. No. 5,183,597 (Lu), to produce an ordered micro-array consisting of truncated pyramidal microstructures on the primed side of a 5 mil (0.13 mm) thick PET film (Melinex 454, Teijin DuPont Films, Chester, Va.). An acrylate resin having a refractive index of 1.56 was used to form the microstructures. This acrylate resin was a polymerizable composition prepared by mixing CN120, PEA, Irgacure 1173, and TPO at a weight ratio of 75/25/0.25/0.1. The microstructures had a peak-to-valley height of 2.4 microns and a pitch (peak-to-peak or valley-to-valley distance) of 16 microns.

Random Nano-Array

Nanostructures were generated on the microstructure surface using a custom-built plasma treatment system described in detail in U.S. Pat. No. 5,888,594 (David et al.) with some modifications. The width of the drum electrode was increased to 42.5 inches (108 cm) and the separation between the two compartments within the plasma system was removed so that all the pumping was carried out by means of the turbo-molecular pump and thus operating at a process pressure of around 5 mTorr.

Samples sheets of the microreplicated articles were taped to the drum electrode for creating the nanostructure by the plasma treatment. The chamber door was closed and the chamber pumped down to a base pressure of $5\times10^{-4}$ Torr. For the plasma treatment, hexamethyldisiloxane (HMDSO) and oxygen were introduced at a flow rate of 20 standard cm$^3$/min and 750 standard cm$^3$/min respectively, and the operating pressure was nominally at 8 mTorr. Plasma was turned on at a power of 6000 watts by applying rf power to the drum and the drum rotated at 12 rpm.

The plasma etching was continued for 120 seconds. Upon completion of the plasma treatment, the gases were stopped, chamber was vented to atmosphere, and the samples were taken out from the drum.

ALD Barrier

A conformal barrier was prepared by means of atomic layer deposition (ALD) over the top of the nanostructure on microstructure. The ALD barrier stack was prepared by coating the nanostructure surface ordered micro-array with an inorganic multilayer oxide. A homogenous silicon aluminum oxide (SiAlO$_x$) was deposited by using a standard ALD chamber using bis(diethylamino)silane precursor (trade name SAM.24) at 40° C. and trimethylaluminum precursor (TMA) at 30° C., at a deposition temperature of 125° C. and at a deposition pressure approximately 1 Torr. The substrate was exposed to 80 total ALD cycles (mixture sequences). Each mixture sequence consists of a remote rf O2 plasma powered at 300 W for 4 seconds, followed by a purging cycle, followed by a dose of TMA for 0.02 seconds, followed by a purging cycle, followed by a remote rf O2 plasma powered at 300 W for 4 seconds, followed by a purging cycle, followed by a dose of SAM.24 for 0.30 seconds, followed by a purging cycle, to yield a homogenous SiAlO$_x$ layer approximately 25 nm thick.

Resin Backfill

Following the ALD process, a protective acrylate coating (99:1 wt % ratio of SR833S to Irgacure 1173) was applied directly onto the SiAlO$_x$ ALD layer using a spin-coating process. The acrylate monomer was cured in a N2-purged UV chamber to yield a protective polymer layer approximately 6.5 µm thick.

Adhesive

A 12-micron thick sheet of polyisobutylene (PIB) adhesive was laminated to the ALD barrier surface by means of hand rolling. The adhesive was used to adhere the film construction to the calcium test glass coupon for testing.

Example 7

Substrate/Ordered Micro-Array/Random Nano-Array/ALD Barrier/Polymer Layer/Adhesive Ordered Micro-Array Example 6 was prepared using a tool that was fabricated using a diamond turning method as described in U.S. Pat. No. 5,696,627 (Benson et al.). The tool was used in a cast-and-cure process as described, for example, in U.S. Pat. No. 5,175,030 (Lu et al.) and U.S. Pat. No. 5,183,597 (Lu), to produce an ordered micro-array consisting of truncated pyramidal microstructures on the primed side of a 5 mil (0.13 mm) thick PET film (Melinex 454, Teijin DuPont Films, Chester, Va.). An acrylate resin having a refractive index of 1.63 was used to form the microstructures. This acrylate resin was a polymerizable composition prepared by mixing biphenyl methyl acrylate, dipropylene glycol diacrylate, tridecyl acrylate, and TPO at a weight ratio of 90/5/5/2. The resin contained 33 wt % of 190 nm silica beads. The microstructures had a peak-to-valley height of 16 microns and a pitch (peak-to-peak or valley-to-valley distance) of 2.4 microns.

Random Nano-Array

Nanostructures were generated on the microstructured surface using a custom-built plasma treatment system described in detail in U.S. Pat. No. 5,888,594 (David et al.) with some modifications. The width of the drum electrode was increased to 42.5 inches (108 cm) and the separation between the two compartments within the plasma system was removed so that all the pumping was carried out by means of the turbo-molecular pump and thus operating at a process pressure of around 5 mTorr.

Samples sheets of the microreplicated articles were taped to the drum electrode for creating the nanostructure by the plasma treatment. The chamber door was closed and chamber pumped down to a base pressure of $5\times10^{-4}$ Torr. For the plasma treatment, oxygen gas was introduced at a flow rate of 100 standard cm$^3$/min, and the plasma operated at a power of 6000 watts for 120 seconds, the operating pressure was at 2.5 mTorr. The drum was rotated at a speed of 12 rpm during the plasma treatment. Upon completion of the plasma treatment, the gases were stopped, chamber was vented to atmosphere, and the samples were taken out from the drum.

ALD Barrier

A conformal barrier was prepared by means of atomic layer deposition (ALD) over the top of the nanostructure on microstructure. The ALD barrier stack was prepared by coating the nanostructure surface ordered micro-array with an inorganic multilayer oxide. A homogenous silicon aluminum oxide (SiAlOx) was deposited by using a standard ALD chamber using bis(diethylamino)silane precursor (trade name SAM.24) at 40° C. and trimethylaluminum precursor (TMA) at 30° C., at a deposition temperature of 125° C. and at a deposition pressure approximately 1 Torr. The substrate was exposed to 80 total ALD cycles (mixture sequences). Each mixture sequence consists of a remote rf O2 plasma powered at 300 W for 4 seconds, followed by a purging cycle, followed by a dose of TMA for 0.02 seconds, followed by a purging cycle, followed by a remote rf O2 plasma powered at 300 W for 4 seconds, followed by a purging cycle, followed by a dose of SAM.24 for 0.30 seconds, followed by a purging cycle, to yield a homogenous SiAlO$_x$ layer approximately 25 nm thick.

Resin Backfill

Following the ALD process, a protective acrylate coating (99:1 wt % ratio of SR833S to Irgacure 1173) was applied directly onto the SiAlO$_x$ ALD layer using a spin-coating process. The acrylate monomer was cured in a N2-purged UV chamber to yield a protective polymer layer approximately 6.5 µm thick.

Adhesive

A 12-micron thick sheet of polyisobutylene (PIB) adhesive was laminated to the ALD barrier surface by means of hand rolling. The adhesive was used to adhere the film construction to the calcium test glass coupon for testing.

Prophetic Example 1:
Liner/Adhesive/Barrier/Adhesive/Liner

A prophetic example is proposed that consists of a structured barrier coating located in between two adhesive layers with matching structure. This could be produced by two different methods:

1. A first adhesive is coated onto a release liner and provided with a structured surface. The structured surface may be provided using methods known in the art, such as, for example, those described in U.S. Pat. No. 6,197,397 (Sher, et al.). Then, a barrier coating is applied to the structured side of the adhesive to provide a barrier coating on the surface of the structured adhesive. The barrier coating may be applied, for example, using the methods of Example 1 or Example 2. Next, a second adhesive is coated or laminated over the barrier coating on the structured adhesive, filling the structure while providing a flat surface on the opposing side. The second adhesive may be the same as the first adhesive or may be different. Lastly, a liner is laminated onto the second adhesive surface to protect the adhesive.

2. A second method, in which a structured release substrate (such as, for example, a release liner having a microstructured surface) is coated with a barrier coating. The barrier coating may be applied, for example, using the methods of Example 1 or Example 2. Then, a first adhesive is coated onto the barrier coated structured release substrate to form a first adhesive layer having a structured surface and a flat surface opposite the structured surface. A release liner is applied to the flat surface of the first adhesive layer to protect the adhesive. Next, the barrier and the adhesive are released from the structured release substrate, exposing the barrier coating on the structured surface of the first adhesive layer. The barrier coating is then coated with a second adhesive to form a second adhesive layer having a second structured surface and a second flat surface opposite the structured surface. A second liner is applied to the second flat surface to protect the second adhesive layer. The second adhesive may be the same as the first adhesive or may be different.

Prophetic Example 2: Liner/Adhesive/Ordered Array/Barrier/Ordered Array/Adhesive/Liner A prophetic example is proposed that consists of a structured barrier coating located between two layers of resin producing an ordered array, which are located between two adhesive layers. This could be produced two different ways:

1. First, an adhesive is coated onto a release liner. Then, a structured resin is coated on the adhesive to produce an ordered array. Then, a barrier coating is applied to the structured side of the ordered array. Next, a resin is coated over the barrier to fill the structure pattern while producing a flat surface on the other side. Next, a second adhesive is coated or laminated over the flat side of the resin. Lastly, a liner is laminated in to protect the second adhesive.

2. First, a structured ordered array is coated with resin onto a release liner, with a first flat surface in contact with the release liner. With the release liner intact, the structured side of the array is barrier coated. Next, the opposite side of the barrier coating is coated with a second resin to fill in the structured surface and create a flat surface on the opposite side of the structured surface. Next, an adhesive is applied to the flat surface of the second resin and protected with a liner. Next, the first structured array is released from the release liner to expose the first flat surface. Next, a second adhesive is applied to the first flat surface and protected with a second release liner.

All references and publications cited herein are expressly incorporated herein by reference in their entirety into this disclosure. Illustrative embodiments of this invention are discussed and reference has been made to possible variations within the scope of this invention. For example, features depicted in connection with one illustrative embodiment may be used in connection with other embodiments of the invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A film comprising:
    a resin layer comprising a structured major surface opposite a second major surface, the structured major surface comprising a plurality of features;
    a barrier layer on the structured major surface, the barrier layer conforming to the shape of the structured major surface; and
    a first adhesive layer on the barrier layer, the first adhesive layer having a first major surface in contact with the barrier layer and a second major surface opposite the first major surface,
    wherein the plurality of features are linear prisms, and
    wherein the distance between an apex of the barrier layer and the second major surface of the first adhesive layer is zero.

2. The film of claim 1, wherein the plurality of features extend along a first direction.

3. The film of claim 2, wherein the plurality of features are substantially continuous along the first direction.

4. The film of claim 1, wherein at least one of the plurality of features extends along a first direction, and at least two of the plurality of features extend along a second direction non-parallel to the first direction.

5. The film of claim 1, the plurality of features extend along concentric circles, rectangles, squares, or other polygon shapes.

6. The film of claim 1, wherein the resin layer has a first refractive index, the first adhesive layer has a second refractive index, and the second refractive index is different from the first refractive index.

7. The film of claim 1, wherein the resin layer has a first refractive index, the first adhesive layer has a second refractive index, and the second refractive index is substantially the same as the first refractive index.

8. The film of claim 1, wherein the barrier layer comprises at least one selected from the group consisting of individual metals, two or more metals as mixtures, inter-metallics or alloys, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, amorphous or tetrahedral carbon structures, amorphous or tetrahedral carbon structures including H or N, graphene, graphene oxide, and combinations thereof.

9. The film of claim 8, wherein the barrier layer comprises metal oxides or metal nitrides.

10. The film of claim 9, wherein the metal oxides or metal nitrides are selected from the group consisting of silicon oxides, aluminum oxides, titanium oxides, indium oxides, tin oxides, indium tin oxide (ITO), halfnium oxide, tantalum oxide, zirconium oxide, zinc oxide, niobium oxide, silicon nitrides, aluminum nitrides, and combinations thereof.

11. The film of claim 1, wherein the first adhesive layer comprises a viscoelastic or elastomeric adhesive.

12. The film of claim 1, wherein the plurality of features are nanoscale features.

13. The film of claim 1, wherein the plurality of features are randomly arrayed features.

14. The film of claim 13, wherein the randomly arrayed features are randomly arrayed nanoscale features.

15. The film of claim 1, wherein the plurality of features comprise microscale features and nanoscale features.

16. The film of claim 15, wherein the plurality of features comprise ordered microscale features and randomly arrayed nanoscale features.

17. The film of claim 15, wherein the nanoscale features are formed on the microscale features.

18. A film comprising:
- a first adhesive layer comprising a structured major surface opposite a second major surface, the structured major surface comprising a plurality of features;
- a barrier layer on the structured major surface, the barrier layer conforming to the shape of the structured major surface; and
- a second adhesive layer on the barrier layer, the second adhesive layer having a first major surface in contact with the barrier layer and a second major surface opposite the first major surface, wherein the plurality of features are linear prisms, and
wherein the distance between an apex of the barrier layer and the second major surface of the second adhesive layer is zero.

19. A film comprising:
- a first resin layer comprising a structured major surface opposite a second major surface, the structured major surface comprising a plurality of features;
- a barrier layer on the structured major surface, the barrier layer conforming to the shape of the structured major surface; and
- a second resin layer on the barrier layer, the second resin layer having a first major surface in contact with the barrier layer and a second major surface opposite the first major surface, wherein the plurality of features are linear prisms, and
wherein the distance between an apex of the barrier layer and the second major surface of the second resin layer is zero.

20. An article, comprising:
the film of claim 1; and
an oxygen or moisture sensitive device.

* * * * *